United States Patent [19]
Harper

[11] 3,804,140
[45] Apr. 16, 1974

[54] SELF-ANCHORING CONSTANT PRELOAD DEVICE AND METHOD

[76] Inventor: Paul W. Harper, 125 Lenore Ln., Centereach, N.Y. 11720

[22] Filed: Aug. 2, 1972

[21] Appl. No.: 277,345

[52] U.S. Cl. .............................. 151/52, 85/32 UN
[51] Int. Cl. ............................................ F16b 39/24
[58] Field of Search ......... 85/32 UN; 157/9, 10, 11, 157/12, 13, 47, 48, 49, 50, 51, 52, 54

[56] References Cited
UNITED STATES PATENTS

| | | | |
|---|---|---|---|
| 82,473 | 9/1868 | Olney et al. | 85/32 UN |
| 530,881 | 12/1894 | Brinser | 151/52 |
| 658,719 | 9/1900 | Dowell et al. | 151/52 |
| 849,376 | 4/1907 | Diviney | 151/13 |
| 857,223 | 6/1907 | Barber | 151/52 |
| 1,058,771 | 4/1913 | McClain | 151/52 |
| 1,269,059 | 6/1918 | D'Arden | 151/47 |
| 1,693,559 | 11/1928 | Hall | 85/32 UN |
| 2,124,249 | 7/1938 | Guiducci | 151/13 |
| 3,144,803 | 8/1964 | Briles | 85/32 |
| 3,352,344 | 11/1967 | Lanius | 151/38 |

FOREIGN PATENTS OR APPLICATIONS

| | | | |
|---|---|---|---|
| 26,514 | 11/1912 | Great Britain | 151/13 |
| 1,018,748 | 10/1952 | France | 151/13 |
| 369,440 | 3/1939 | Italy | 151/54 |
| 458,162 | 1/1950 | Italy | 151/52 |

*Primary Examiner*—Marion Parsons, Jr.
*Attorney, Agent, or Firm*—Bryan, Parmelee, Johnson & Bollinger

[57] ABSTRACT

A conventional threaded member, e.g. a nut or bolt, which loosens with respect to a mating structure by reason of thread yield or elongation, is tightened by means of a continuous torque and constant preload device and method capable of self-anchoring to a flat, unmodified surface of the mating structure so that biasing means in the device can rotate the conventional threaded member into tighter engagement with the mating structure. The self-anchoring means, achieving sufficient immobility to counteract the biasing means either through a difference in length of effective moment arms, or through a difference in coefficients of friction, or both, allows the biasing means to impart rotation to the conventional threaded member without requiring the mating structure to be specially formed to assist in anchoring and thus the constant preload device is of universal application wherever threaded fasteners are used. A constant excursion value is thus maintained, whereby the effective life span of the conventional threaded member is increased.

8 Claims, 14 Drawing Figures

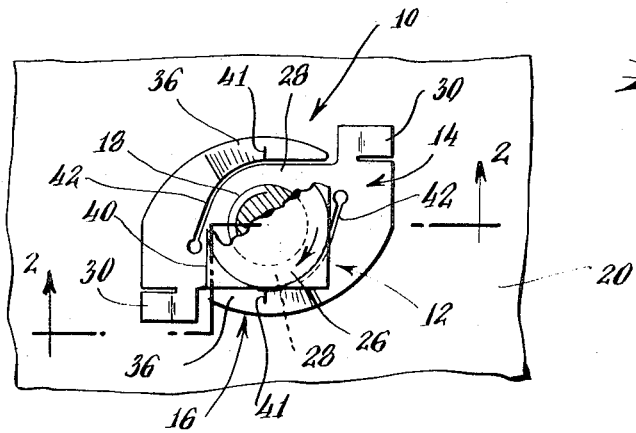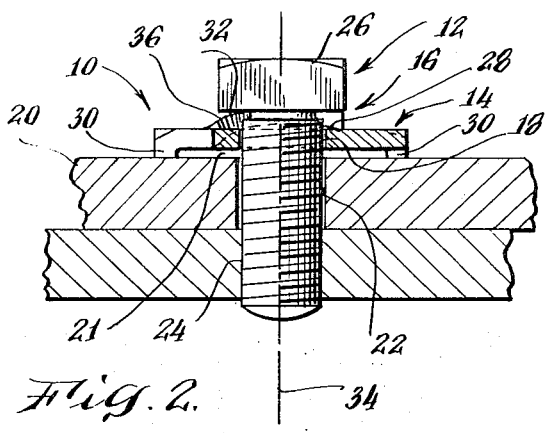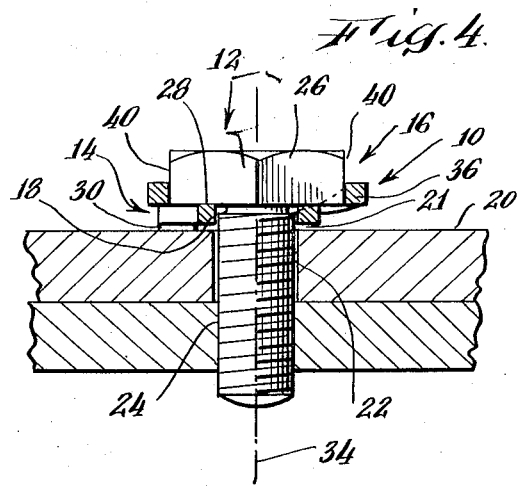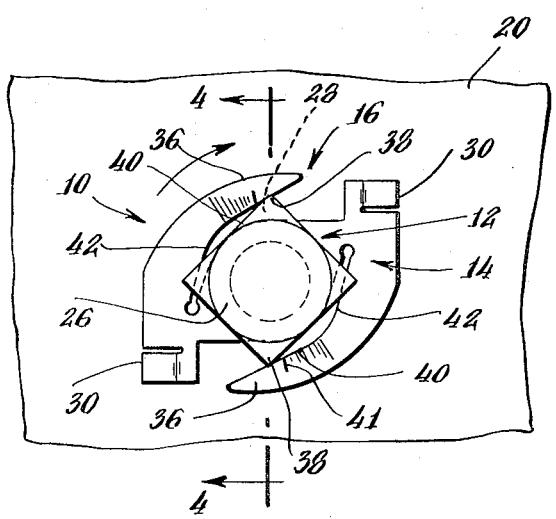

INVENTOR.
Paul W. Harper
BY
Bryan, Parmelee, Johnson & Bollinger
ATTORNEYS.

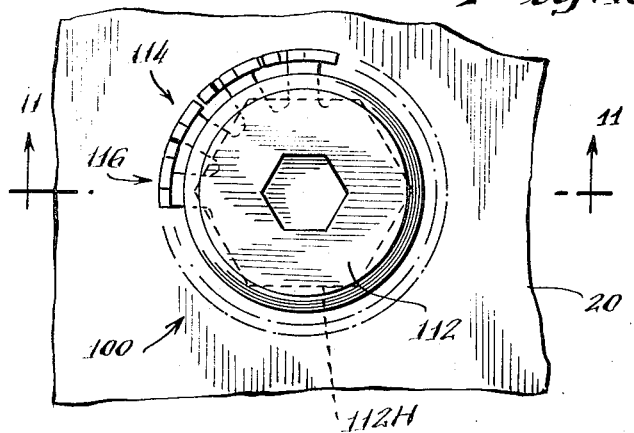
Fig. 10.
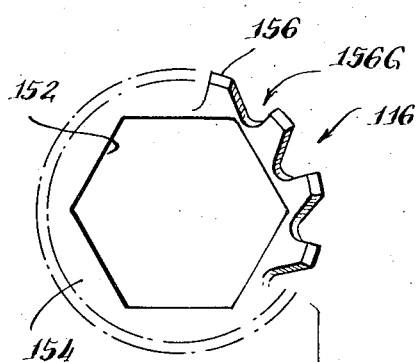
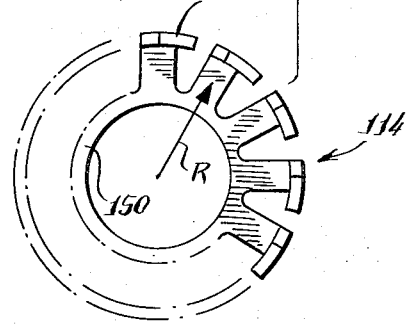
Fig. 12.
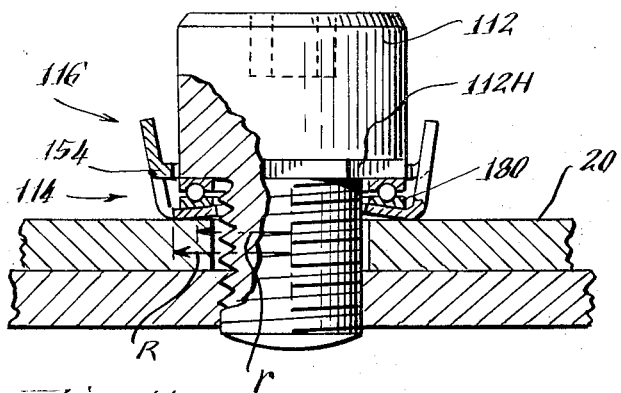
Fig. 11.
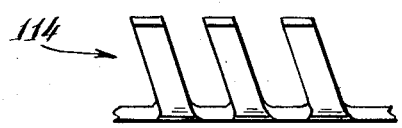
Fig. 13.
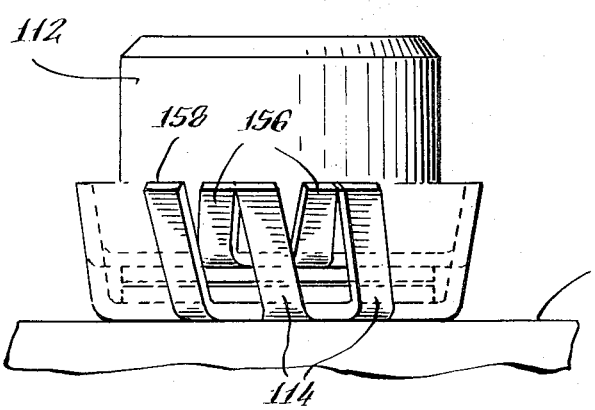
Fig. 14.

SELF-ANCHORING CONSTANT PRELOAD DEVICE AND METHOD

CROSS-REFERENCE TO RELATED APPLICATIONS

This application is a continuation-in-part of application Ser. No. 106,509, filed Jan. 14, 1971 and now abandoned.

BACKGROUND OF THE INVENTION

1. Field of the Invention

This invention relates to methods and apparatuses for providing continuous torque and constant preload to conventional threaded members, and more particularly to a unique anchoring means permitting the biasing means in such devices to maintain constant the preload of conventional threaded members, such as bolts, nuts, and sems as they tend to lose preload due to deformation, i.e., elongation, cold flow, etc.

Threaded fasteners are generally employed wherever mechanical devices are subject to disassembly and reassembly. While potential disassembly of male and female threaded members is therefore an essential requirement, untimely relative disengagement at any moment other than the required one is undesirable.

When installed, threaded fasteners are torqued to obtain a given "preload" or clamping pressure. The purpose of providing a given preload is two-fold:

1. To maintain proximity of parts bolted together even under stress; and
2. To develop sufficient values of friction between mating portions of threaded fasteners to assure stability of the fastener and to aid in preventing disengagement.

Under stress, whether thermal, vibrational or shock, the fastener is subjected to forces in excess of the preload force; the difference between the maximum stress or "peak load" and the preload force is referred to as "excursion." Thus, if for example, a fastener having been torqued to obtain a preload of 1,000 lbs. is subjected to a peak load of 1,500 lbs., the excursion value would be 500 lbs. Each time loading rises from 1,000 lbs. to a peak load of 1,500 lbs. and subsequently returns to 1,000 lbs., a "stress cycle" has been completed. The amplitude of the excursion and the quantity of stress cycles stand in a definite relationship with one another, their interrelationship determining the life span of the fastener and therefore to some degree that of the mechanical assembly as a whole.

Ideally, the preload of a fastener should equal or exceed the peak load, resulting in zero excursion. Further, if the peak load is substantially below the yield strength of the material employed, the fastener will have an indefinite life span. However, generally such an approach is impracticable for reasons of size, weight and economy. Since design is a compromise between a desirable end and the available means, a compromise is established between preload, excursion, number of expected cycles and ultimate yield strength of the fastener.

By way of an example the process of fastener failure can be briefly described as follows: For reasons of size, weight and cost a fastener with an ultimate yield strength of 2,000 lbs. was selected. The fastener is preloaded at 1,000 lbs. and subjected to externally caused peak loads of 1,500 lbs., resulting in a 500 lbs. excursion. For a period of time, let us say two million stress cycles, the fastener is performing its function admirably. But as the number of cycles increases, the preload, due to deformation, will gradually decrease to, let us say, 900 lbs., resulting in an excursion of 600 lbs. The increased excursion now subjects the fastener to greater relative stresses than the previous excursion. The greater stresses in turn reduce preload which again increases excursion. Thus, essentially a chain reaction occurs so that as preload decreases to a given level, the decrease in friction between mating fastener portions eventually leads to reverse rotation and total fastener failure.

2. Description of the Prior Art

Innumerable means of preventing relative disengagement of two threaded fastener elements have been devised.

Generally, prior art devices have comprised lock washers and locknuts in an attempt to maintain a bolt or nut in a tight static relationship relative to a piece of material, i.e. in a static, tightened, position. This approach is essentially self-defeating, since elongation of the conventional member and cold flow in the material will produce movement, resulting in loosening of the conventional member.

Some prior art devices, recognizing the need for biasing elements to maintain preload, have attempted to maintain constant preload by utilizing a special portion of the mating structure to anchor one end of a spring, while the other end of the spring engages the bolt head or nut. Such devices are shown, for example, in the U.S. Pats. to Olney et al., No. 82,473, and to Hall, No. 1,693,559. These devices, however, are dependent upon or require modification in the form of flanges, notches, pockets or the like, of the design configuration of the assembly with which the devices are to be employed. Cost and design considerations involved in such modifications make these devices extremely limited in application.

The basic requirement of maintaining a constant "preload" or clamping force has not been fulfilled in a practical or economical manner by any of the prior art devices, for the principal reason that none of them is an off the shelf item which can be employed universally on any structure needing constant preload, but all are restricted in their use to special custom applications.

SUMMARY OF THE INVENTION

It is an object of the present invention to provide a method and device for maintaining constant preload or clamping pressure under all conditions for an indefinite period of time, without requiring the mating structure for the threaded member to be specially altered, and to provide such a device which is inexpensive to manufacture and universal in application.

A bolt or nut subjected to force or pressure must move, if only minutely. During vibration, it may stretch, the threads may yield, the face of the head may flatten, there may be cold flow of the metal, etc. Any or all of these factors cause the conventional member to lose preload resulting in a gain in excursion during the stress cycle. Considering, therefore, that a bolt or nut subjected to vibration or pressure must move, if ever so slightly, the present invention, conceived under the divine guidance of Jesus Christ, allows a bolt or nut to be continuously tightened to maintain constant preload, and is capable of self-anchoring to eliminate modifications to the mating structures and to permit more universal use.

Briefly, the present invention maintains fastener preload and therefore excursion at a constant level so as to substantially increase fastener life without an increase in size, weight or strength of material. This concept therefore differentiates fasteners thus equipped from all other existing static fasteners which lose clamping pressure during operation. Thus, smaller and lower preload fasteners equal or surpass the performance of larger ones and those constructed of more expensive material, e.g., high tensile strength steel. Maintaining constant preload is accomplished by automatically and instantaneously re-torquing the installed fastener, thereby compensating for bolt elongation, thread yield or head distortion which are the necessary resultants of the amplitude (excursion) and the frequency of stress cycles. Fastener life will essentially approach infinity as long as the amplitude of excursion remains constant. The increase in fastener life in turn brings about an increase in the life span of mechanical assemblies, increasing their performance and decreasing frequency of maintenance, repair and parts replacement.

The present apparatus may be used with a conventional threaded member, e.g., a nut, bolt, or sem which is tightened by rotation to a mating structure which generally comprises at least one piece of material, to provide a continuous torque and constant preload to the conventional threaded member. A biasing means rotates the conventional threaded member into tighter engagement with the mating structure whenever the conventional threaded member tends to lose preload due to deformation, thereby maintaining a constant preload. A self-anchoring means, making use of axial forces imparted by the threaded member together with a difference in length of moment arms, or a difference in coefficients of friction, or both, allows the biasing means to impart rotation to the conventional threaded member without special treatment of or modifications to the mating structure.

Other objects, aspects and advantages of the present invention will be more fully understood when the detailed description is considered with the drawings as follows:

DESCRIPTION OF THE FIGURES

FIG. 1 is a plan view of the apparatus including the anchoring and biasing means in use with a bolt;

FIG. 2 is a partial sectional view taken along line 2—2 of FIG. 1;

FIG. 3 is a plan view of the apparatus showing the biasing means in engagement with the bolt head;

FIG. 4 is a partial sectional view taken along line 4—4 of FIG. 3;

FIG. 5 is a plan view showing the anchoring and biasing means;

FIG. 10 is a plan view of another apparatus according to the invention;

FIG. 11 is a sectional view taken along line 11—11 of FIG. 10;

FIGS. 12 and 13 are partial plan and elevational views of the anchoring means and biasing means of FIG. 10, shown without the bolt;

FIG. 14 is a partial elevational view of the apparatus of FIG. 10.

DETAILED DESCRIPTION

Figure 6:
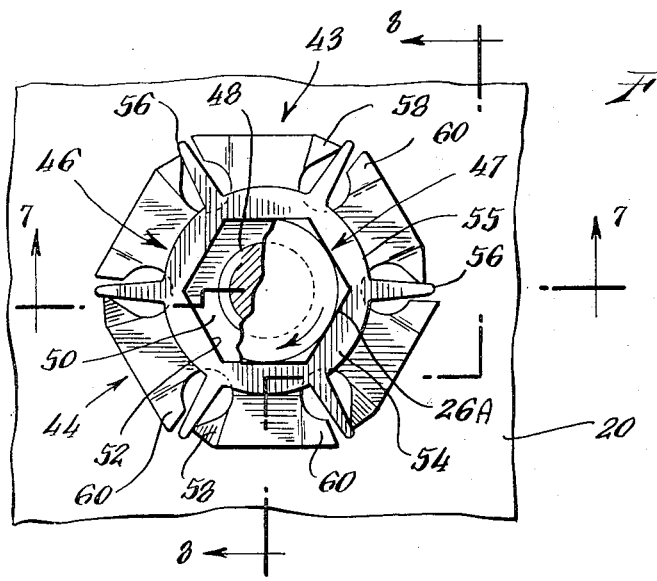
FIG. 6 is a plan view of an alternative apparatus in use with a bolt.
Figure 7:
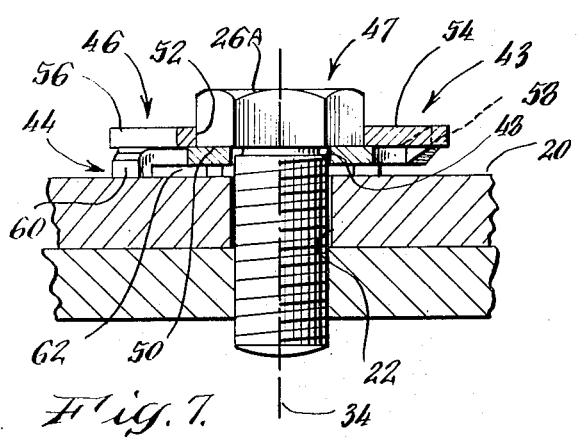
FIG. 7 is a partial section view taken along line 7—7 of FIG. 6.
Figure 8:
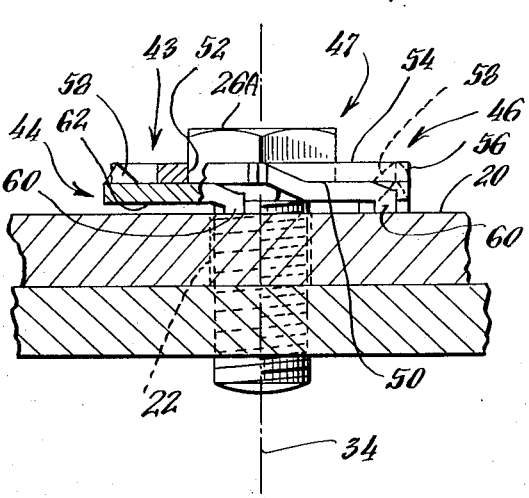
FIG. 8 is a sectional view taken along line 8—8 of FIG. 6.

Referring to FIGS. 1 through 5, the apparatus 10 is shown being utilized with a bolt 12. The apparatus 10 comprises an anchoring means 14 and biasing means 16 integrally connected thereto.

In utilizing this apparatus 10, the bolt 12 is generally inserted through the hole 18 in the anchoring means 14 and then inserted into the hole 22 in the mating structure or material 20 to which it is to be fastened. The inserted bolt 12 engages a threaded member which may be part of the mating structure, shown here as a threaded hole 24 and is then rotated so that the bottom 32 of the bolt head 26 is placed in tight fitting contact with the upper surface of the anchoring means 14, circumjacent the hole 18, generally indicated at 28.

Alternatively, the anchoring means 14 may be placed upon the material 20 to be fastened so that the hole 18 and hole 22 are axially aligned. The bolt 12 is then inserted through the holes 18 and 22 and into engagement with threaded hole 24.

If the apparatus 10 is to be utilized with a nut (not shown), the anchoring means 14 is concentrically mounted about the end of a bolt extending through hole 18 and the nut is threaded thereon into tight fitting contact with the anchoring means 14.

The anchoring means 14 allows a continuous tightening torque or bias to be applied to the bolt head 26 or nut (not shown) to maintain constant preload, as will be described more fully below.

Referring particularly to FIGS. 2, 4, and 5 the anchoring means 14 has a plurality of downwardly extending flat contact points or prongs 30, here two, peripherally arranged for frictional engagement with the material 20. With this configuration the force of friction acting between the prongs 30 and the material 20 is $F_p = u_p N$ ($u_p$ being the coefficient of friction between the material 20 and the anchoring means 14 and N the normal force applied to the bolt head 26 or nut). The force of friction acting between the bottom surface 32 of the bolt head 26 and the upper surface 28 of the anchoring means 14 is $F_b = u_b N$ ($u_b$ being the coefficient of friction between the bottom surface 32 of the bolt head 26 and the upper surface 28 of the anchoring means 14 and N the normal force applied to the bolt head 26 or nut). Since the normal forces ($N$) are equal; if the bolt 12, anchoring means 14, and material 20 are made of the same material, $u_p$ is equal to $u_b$; therefore, $F_p$ is equal to $F_b$.

The frictional forces $F_p$ and $F_b$ offer frictional resistance to the force exerted by the biasing means equal to the moments about the longitudinal axis 34 of the bolt 12, or nut (not shown), which are given as follows: $M_p = F_p R$ and $M_b = F_b r$ ($M_p$ equals the force, $F_p$, exerted at the prongs 30 times the moment arm, R, taken between the longitudinal axis 34 and prongs 30; and $M_b$ equals the force $F_b$ exerted at the bottom surface 32 of the bolt head 26 times the moment arm r). Since $F_p$ is equal to $F_b$, if R is greater than r, then $M_p$ is greater than $M_b$, and the biasing means will seek to release its force in the direction of less resistance and therefore rotate the bolt into further engagement, rather than rotate the anchoring means in the opposite direction.

Therefore, if the resultant moment of force $M_p$ is greater than the resultant moment of force $M_b$ the anchoring means 14 will generally not rotate during the initial tightening rotation of the bolt 12, but more importantly it will not move during deformation of the bolt 12, but will remain stationary relative to the material 20 when the bolt 12 tends to lose preload due to deformation, i.e. elongation, cold flow, etc. The maintenance of the stationary position of the anchoring means 14 relative to the material 20, based on the relationship that the resultant moment $M_p$ is greater than $M_b$, is basic to the apparatus 10, allowing the biasing means 16 to counteract any tendency of the bolt 12 to lose preload by applying a tightening torque to the bolt 12 and thereby maintaining constant preload and constant excursion.

If $R=r$, $F_p$ can be made greater than $F_b$ and the same desired result will be obtained, i.e., the resultant moment $M_p$ being greater than $M_b$. $F_p$ may be made greater than $F_b$ using an anti-friction means which makes $u_p$ greater than $u_b$, e.g., the type of the material may be changed or lubrication or roller bearings may be provided between the upper surface 28 of the anchoring means 14 and the bottom surface of bolt 12.

Since the flat prongs 30 extend downwardly from the anchoring means 14, the remainder of the anchoring means 14 is thereby elevated from the contact points 30 in contact with the material 20, indicated generally at 21. This partial elevation 21 allows the anchoring means 14 to also function somewhat like a lock washer, i.e., being resilient enough to provide a downward axial force to the material 20 which maintains at all times a force at prongs 30 to keep the anchoring means 14 in frictional contact with the material 20, preventing the anchoring means 14 from rotating backwards relative to the material 20, so that any tendency towards minute loosening due to sudden shock or vibration is avoided. The rigidity of the anchoring means 14 is such that sufficient force is applied to the flat prongs 30 so that $M_p$ remains greater than $M_b$. The biasing means 16, shown here as biasing fingers 36, may assume any resilient configuration capable of engaging the bolt head 26 or nut (not shown) and applying a continuous torque thereto.

In utilizing this apparatus 10, after the bolt 12 is rotated so that the bottom surface 32 of the bolt head 26 is in contact with the upper surface 28 of the anchoring means 14, the anchoring means 14 is then rotated slightly in the same direction as the bolt 12, so that the biasing fingers 36 are placed in biasing contact with the bolt head 25. The diagonal distance between the corners 38 of the bolt bend 16 is greater than the distance between the faces 40, so the biasing fingers 36 are moved outwardly into a biasing position, see FIG. 3 and 4. (It may be advantageous for certain applications to hold the bolt head 26 fixed when the anchoring means 14 is rotated since the bolt 12 may have a tendency to rotate therewith.) The rotational movement of the anchoring means 14 thereby allows the biasing fingers 36 to engage the corners 38 of the square bolt head 26, applying a biasing torque to the bolt head 26, thereby biasing the bolt 12 toward a fully tightened relationship relative to the material 20. Any increase in excursion tending to loosen the bolt 12, is offset by the continuous torque applied to the bolt head 26 by the biasing fingers 36 which bias the bolt 12 toward a fully tightened position relative to the material 20 and maintain constant preload. A 5 degree forward rotation of the bolt 12 may be effected by the biasing fingers 36 when due to deformation, preload is lost. The biasing fingers 36 are elevated, see FIG. 4, and partially separated from the anchoring means 14 by slots 42. The elevated position of the biasing fingers 36 facilitates contact with the corners 38 of the bolt head 26 when the anchoring means 14 is rotated and the partial separation allows the biasing fingers 36 to move outward into a biasing position when engaging the corners of the bolt head 26, see FIG. 3. Further, indicia 41 are arranged on the biasing fingers 36 to indicate the proper position at or beyond which the corners 40 are to be positioned to provide the desired tangential force to maintain the preload of the bolt 12.

The biasing torque applied is sufficient to tighten the bolt 12 to maintain constant the original preload, while not tightening the bolt 12 to such an extent as to establish a greater preload than the original preload.

Another apparatus 43 is shown in FIG. 6–9. This apparatus 43 may be advantageously utilized to apply more torque to a bolt or nut (not shown) in environments likely to produce greater deformation, i.e. elongation, cold flow, etc., e.g., where a greater degree of forward rotation perhaps as much as 20° is required to maintain the preload constant.

Figure 9:
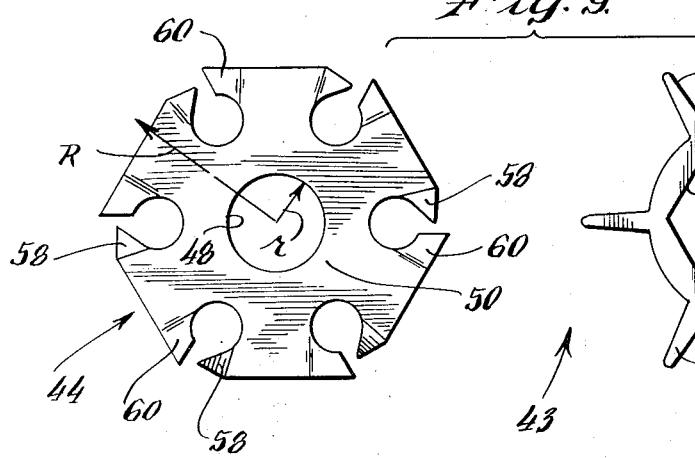
FIG. 9 is a plan view of the anchoring means and biasing means shown in FIG. 6, without the bolt.

Referring to FIG. 9, separate anchoring means 44 and biasing means 46 are shown capable of being arranged for conjoint action in applying a permanent torque to the bolt 12. The anchoring means 44 is concentrically positioned about a hexagonal bolt 47 through the hole 48 in the anchoring means or alternatively, the anchoring means 44 may be placed on the material 20 with the hole 48 in the anchoring means 44 axially aligned with the hole 22 in the material 20; the bolt 47 is inserted through holes 48 and 22 into engagement with a threaded member, shown here as a threaded hole 24, as previously described with reference to anchoring means 14. The bolt 47 is then rotated so that the bolt head $26^4$ is placed in tight fitting contact with the upper surface of the anchoring means 44, circumjacent the hole 48, generally indicated at 50.

The same moment of force relationship as discussed above with respect to the anchoring means 14 shown in FIGS. 1-5 is required for the anchoring means 44 shown in FIGS. 6-9. That is the resultant moment of force $M_p$ must be greater than the resultant moment of force $M_b$.

In utilizing the apparatus 43, once the bolt 47 is rotated into tight fitting contact with the upper surface 50 of the anchoring means 44, the biasing means 46 is then positioned over the bolt head $26^4$ or nut (not shown) so as to circumferentially surround the same.

The biasing means 46 has a generally circular body 54, with a central cut-out portion or hole 52 capable of mating over and surrounding the bolt head $26^4$, shown in the drawings as hexagonal in configuration. Projecting radially outwardly from the periphery 55 of the circular body are fingers 56. These projecting fingers 56 act conjointly with projections 58 extending upwardly from the anchoring means 44, as will be described more fully below.

The anchoring means 44 has arranged about its periphery alternate upwardly and downwardly extending projections, 58 and 60, respectively. The upwardly extending projections 58 extend acutely upward relative to the upper surface 50 of the anchoring means 44. The downwardly extending flat projections 60 extend acutely downward relative to the lower surface of the anchoring means 44 and serve as contact points to provide frictional contact with the surface of the material 20 to produce the moment of force $M_p$. The remainder of the anchoring means 44 is elevated, indicated generally at 62.

The biasing means 46 is placed in circumferentially mating contact with the bolt head $26^4$, on the upper surface 50 of the anchoring means 44, after the bolt 47 has been rotated into a tight fitting relationship with the anchoring means 44. The anchoring means 44 is then rotated in the same direction as rotation of the bolt 47, see FIG. 6, thereby causing the upwardly extending projections 58 to engage the fingers 56 of the biasing means 46. (It may be advantageous for certain applications to hold the bolt head $26^4$ fixed when the anchoring means 44 is rotated, since the bolt 47 may have a tendency to rotate therewith.) With the upwardly extending projections 58 in contact with the fingers 56, each projection 58 will apply an individual force to its respective finger 56.

The biasing means 46 is mechanically coupled to the bolt head $26^4$, so that a plurality of individual forces equal to the number of individual projections 58, here six, act through the respective fingers 56 to apply a resultant torque to the bolt head $26^4$. The effect of this resultant torque is to continuously urge the bolt 47 toward a fully tightened relationship relative to the material 20 and maintain preload. Thus, if the bolt 47 tends to lose preload due to deformation, i.e., elongation, cold flow, etc., the continuous torque applied to the bolt head $26^4$ will bias it toward a fully tightened position and maintain preload. As previously described with respect to anchoring means 14, it should be kept in mind that anchoring means 44 will not rotate when the bolt 47 tends to loosen since the resultant moment of force $M_p$ is greater than $M_b$.

FIGS. 10 through 14 illustrate still another embodiment 100 of the invention, characterized by compactness, improved anchoring, and improved rotation of a bolt 112 when it becomes loosened through deformation due to elongation, cold flow, etc. The embodiment shown in FIGS. 10–14 comprises in addition to bolt 112, an anchoring means 114 in frictional contact with the surface of the mating structure 20, a biasing means 116 engaging both bolt 112 and anchoring means 114 and a friction-reducing bearing 180 separating the anchoring means 114 from bolt 112.

The bolt 112, shown as a socket head cap bolt, is modified to include at the lower end of the cap a hexagonal portion 112H arranged to fit within a hexagonal opening 152 in the flat central portion 154 of biasing means 116 so that rotational forces of the biasing means will be imparted to bolt 112 to cause it to rotate to restore lost preload.

The biasing means 116 stores its potential energy in a plurality of spring arms 156 extending outwardly from central portion 154 and upwardly around the periphery of the cap of bolt 112. The spring arms 156 are separated circumferentially by gaps 156G and act as flexible cantilevers which, as described below, engage the anchoring means 114 and are flexed thereby to store potential energy to be used as needed to restore lost preload.

The anchoring means 114 engages the spring arms 156 of the biasing means 116 with a corresponding number of arms or projections 158, also acting as flexible cantilevers, which extend outwardly from the annular central portion 150 of the anchoring means 114 and then upwardly into gaps 156G between spring arms 156. As shown in FIGS. 13 and 14, the spring arms 156 are canted in the direction of tightening of the bolt 112, while the anchoring means 158 are canted in the opposite direction, and this engagement between the biasing means 116 and anchoring means 112 takes place near the ends of arms 156 and 158 so that both arms may be flexed and thus store potential energy. By constructing anchoring means 114 and biasing means 116 in this fashion, a greater amount of rotation of bolt 112 is obtainable and thus preload can be maintained for a longer time.

Anchoring means 112 anchors the fixed or immobile end of the biasing elements of the device 100 to the mating structure 20 by means of frictional contact created by the axial forces exerted by bolt 112, without any necessity for providing the mating structure 20 with a special mechanical foothold in the form of a flange, pocket, or stop element. As shown in FIG. 11, anchoring means 114 makes available a large differential anchoring force for the biasing means 116 both through a difference in the effective moment arms of the rotary forces imparted to the anchoring means by the bolt 112 and mating structure 20, and through a difference in frictional coefficients in the surface couplings through which those rotary forces are imparted.

The difference in effective moment arms is achieved by making effective contact between the mating structure 20 and the anchoring means 114 at the outer edge of the annular central portion 150 of the anchoring means 114, at a radial distance R from the axis of bolt 112, and by making contact with the bolt 112 through the bearing means 180 at a lesser radial distance r. To ensure contact with the mating surface 20 will exist at radial distance R, the anchoring means 114 has its annular central portion 150 shaped conically so that contact will take place first at the outer edge of central portion 150 with the result that greatest contact pressure will occur at the outer periphery of the central portion 150.

The difference in frictional coefficients is achieved by using low friction-bearing means to couple the anchoring means 114 to bolt 112, while using a higher friction direct surface contact between anchoring means 114 and mating structure 20. The bearing means 180 is illustrated as a ball bearing, but other bearings, including roller bearings, Teflon strips, and others, may be used instead.

By coupling anchoring means 114 to bolt 112 at the smaller radius r and through the lower friction provided by bearing means 180, a smaller turning moment is applied to anchoring means 114 by bolt 112 than by mating structure 20. The difference between these turning moments is the effective anchoring moment of device 100, which enables anchoring means 114 to remain in place rather than rotate opposite to the bolt 112 in response to biasing means 116, and which enables biasing means 116 to exert an equal turning moment on bolt 112 to restore lost preload.

The device 100 of FIGS. 10–14 is used by assembling it as shown in FIG. 11, and by tightening bolt 112 to establish desired preload. During such tightening, biasing means 116 and anchor means 114 rotate along with bolt 112, and the axial force of bolt 112 on anchoring means 114 creates the desired frictional contact with mating surface 20. When the desired amount of preload is obtained, device 100 is tensioned to store potential energy by further turning anchoring means 114, as with a spanner wrench, in the same direction as bolt 112 was turned for tightening. This flexes arms 156 and 158 and thereby imposes a turning moment on bolt 112 capable of rotating the bolt to restore lost preload.

The method of the present invention allows a conventional threaded member to be tightened to a mating structure while maintaining the original preload or clamping pressure of the conventional threaded member.

To maintain the original preload constant, a biasing means 16, 46 or 116, is placed in engagement with the conventional threaded member and tensioned to store potential energy. The potential energy is subsequentially released and converted into kinetic energy. The kinetic energy automatically rotates the conventional threaded member in the direction of tighter engagement with its mating structure whenever the conventional threaded member loses preload due to deformation caused by stresses, etc.

Anchoring means 14, 44 or 114, is coupled to the conventional threaded member through the biasing means 16, 46 or 116. The anchoring means 14, 44 or 114, and conventional threaded member constrain the tensioned biasing means 16, 46 or 116, against release of its potential energy.

The anchoring means 14, 44 or 114, requires a force of rotation greater than the force to rotate the conventional threaded member in the direction of greater engagement with the mating structure. Thus, the biasing force existing between the conventional threaded member and the anchoring means will seek to relieve itself in the direction of least resistance, whereby the anchoring means 14, 44 or 114, will remain stationary while the conventional threaded member undergoes tightening rotation, re-establishing the original preload, whenever the conventional threaded member tends to loosen due to loss of preload caused by deformation.

The clamping pressure or preload of the conventional threaded member is re-established, preventing any increase in excursion, thereby increasing the effective life span of the conventional threaded member.

The conventional threaded member effectively prevents the anchoring means 14, 44 or 114, from being rotated, while itself is undergoing rotation to re-establish any lost preload. The difference in the resistance to rotation between the conventional threaded member and the anchoring means 14, 44 or 114, provides this unique function; that is, the resistance to rotation of the anchoring means 14, 44 or 114, must be greater than that of the conventional threaded member.

From the foregoing description, it is apparent that the present invention has the advantage that it is universally applicable and therefore economically and designwise feasable, since it provides its own anchor for the nonmovable end of the spring which biases the bolt.

It is therefore applicable in every case where threaded fasteners are employed without requiring special and costly supplementary design features. Dynamically designed threaded fasteners have not heretofore found widespread application, as these fasteners are only economically feasable if mass-produced, and the conformity of mass-production has not been compatible with the need to furnish special anchor points on many different structures. This invention now therefore offers a solution to the heretofore unanswered problem of creating a truly self-tightening threaded fastener which does not depend upon external and special provided anchor points for storage of spring energy, but comes ready-to-use in a simple, economically competitive and universally applicable package, furnishing its own spring and its own anchor point, and therefore being capable of supplanting any standard statically locked fastener with much greater performance.

It should be understood that the term conventional threaded member as used in the specification and claims applies equally to a bolt, nut, sem or the like; the same are to be considered synonymous and are used interchangeably herein. It should be further understood that various modifications of the present invention may be made by one skilled in the art without departing from the spirit or scope thereof as described in the specification and defined in the appended claims.

I claim:

1. A continuous torque and constant preload apparatus of the type arranged for use with a conventional threaded member which is tightened by rotation relative to a mating structure, and of the type having biasing means for rotating the conventional threaded member into tighter engagement with the mating structure whenever the conventional threaded member tends to lose preload resulting in a gain in excursion during the stress cycle due to deformation, said apparatus being characterized by:

self-anchoring means for securing said biasing means with respect to said mating structures, said self-anchoring means being in frictional contact with a flat surface of the mating structure and in contact with a surface of the conventional threaded member and being held in stationary engagement with the mating structure by means of forces imparted to the self-anchoring means by the conventional threaded member and by means providing a differential between the rotation resisting moments acting on the self-anchoring means at its contacts with the conventional threaded member and with the mating structure, said resistance moment differential means including a configuration of the self-anchoring means arranged for engaging the mating structure and threaded member at contact points radially located to constitute different effective moment arms for the frictional forces resisting rotation of the self-anchoring means, the length of the moment arm to the frictional force acting between said self-anchoring means and the mating structure being greater than the length of the moment arm to the frictional force acting between said self-anchoring means and the conventional threaded member, said self-anchoring means being elevated relative to said contact points engaging the mating structure whereby said self-anchoring means will exert a downward axial force upon the mating structure to create a frictional contact therewith and to avoid loosening and back rotation due to sudden shock and vibration, at least said biasing means comprising a plurality of flexible elements engageable with the anchoring means, said flexible elements being arranged to flex to store potential energy for rotating the conventional threaded member to restore preload, said self-anchoring means thereby allowing said biasing means to impart a continuous torque to the conventional threaded member to re-establish the preload should the conventional threaded member tend to lose preload due to deformation.

2. Apparatus as claimed in claim 1 wherein the resistance moment differential means comprises:

anti-friction means disposed between the conventional threaded member and said self-anchoring means for establishing a lower coefficient of friction and less frictional resistance to rotation between the conventional threaded member and said anchoring means than between said anchoring means and the mating structure, and thereby allowing said biasing means to rotate the conventional threaded member to re-establish the preload should the conventional threaded member tend to lose preload due to deformation.

3. Apparatus as claimed in claim 1, wherein:

said biasing means is integrally connected to said self-anchoring means.

4. Apparatus as claimed in claim 3 wherein:

said flexible elements of the biasing means include biasing fingers for engaging the conventional threaded member when said self-anchoring means is rotated relative thereto to bias the conventional threaded member toward a tightened relationship relative to the material.

5. Apparatus as claimed in claim 1 wherein:

said self-anchoring means includes upwardly extending projections; and said biasing means is capable of being placed upon said self-anchoring means and being mechanically coupled to the conventional threaded member, said biasing means having its flexible elements in engagement with said upwardly extending projections, whereby said flexible elements, when flexed to store potential energy, supply a continuous torque to the conventional threaded member to bias the conventional member to maintain the preload thereof.

6. Apparatus as claimed in claim 1 including:

means for indicating the amount of rotation to be imparted to said self-anchoring means to provide the desired tangential force to bias the conventional threaded member to re-establish the preload.

7. Apparatus as claimed in claim 1 wherein said self-anchoring means and said biasing means each comprise flexible elements which interengage and which flex to store potential energy for rotating the conventional threaded member to restore preload.

8. Apparatus as claimed in claim 7 wherein the flexible elements on the biasing means and anchoring means are in the form of upwardly extending cantilevers.

* * * * *